Figure 3:
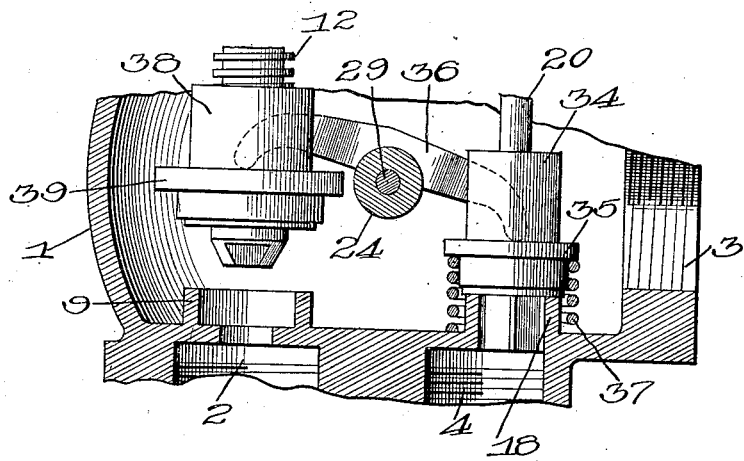

E. H. GOLD.
THREE WAY COCK.
APPLICATION FILED APR. 13, 1908.
909,583.
Patented Jan. 12, 1909.
2 SHEETS—SHEET 1.
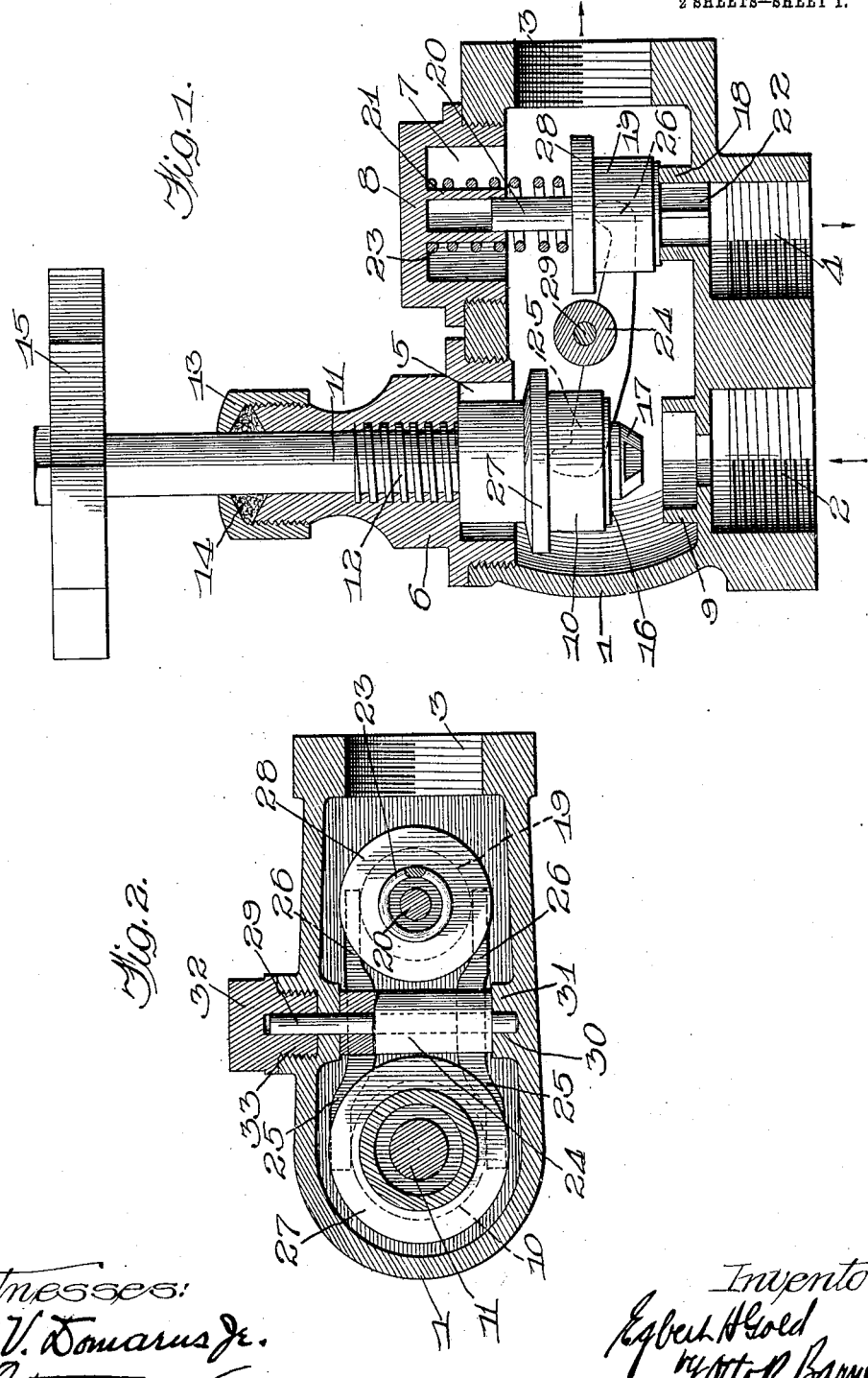

E. H. GOLD.
THREE WAY COCK.
APPLICATION FILED APR. 13, 1908.

909,583.

Patented Jan. 12, 1909.

2 SHEETS—SHEET 2.

UNITED STATES PATENT OFFICE.

EGBERT H. GOLD, OF CHICAGO, ILLINOIS.

THREE-WAY COCK.

No. 909,583.   Specification of Letters Patent.   Patented Jan. 12, 1909.

Application filed April 13, 1908. Serial No. 426,719.

*To all whom it may concern:*

Be it known that I, EGBERT H. GOLD, a citizen of the United States, residing at Chicago, in the county of Cook and State of Illinois, have invented certain new and useful Improvements in Three-Way Cocks, of which the following is a specification.

My invention relates to three-way cocks and has for its object to provide a device of that character which shall be suitable for use, for example, as a supply and drip cock in car heating systems; which will be more effectual to prevent leakage and more durable than those commonly in use at the present time; which shall be simple and compact in structure, composed of a few parts which are easily assembled; and which shall be small in size, so as to economize metal and permit the device to be connected with pipes lying close together, for example, with the supply and drip pipes of a steam heating system for railway cars in the positions in which they are ordinarily located. It has been customary to use a three-way cock in this connection which comprises a single valve disk that is rotated into different positions either to open the supply port and close the drip or to close the supply and open the drip. A valve of this sort is not altogether satisfactory under practical steam heating conditions, because it wears unevenly, so as to cause leakage as time goes on; the outer edge of the disk obviously being subjected to greater wear than its center. The water which passes through valves used in this connection is often very dirty and gritty, with the result that the valve is soon worn and becomes leaky.

My invention contemplates the use of two reciprocating valves, one for the inlet and the other for the drip port and connecting these valves by a lever pivoted in the valve casing, so that when one of the valves is opened the other will be closed. My valve is particularly designed, as has been intimated, to control the supply and drip pipes of a car heating system, although, of course, it may be used in other connections. The construction of cars makes it convenient, if not necessary, that the supply and drip pipes should lie close together. Hence the cock must be so constructed that the valves stand close to each other. It is necessary also that the device should be comparatively small in order to make it economical and usable under prevailing conditions. It is also necessary to have it of simple construction, because the repairs on such devices are ordinarily made by comparatively unskilled workmen. My invention contemplates a construction which will attain all of these desirable objects.

The invention has for further objects such other new and improved constructions and devices in three-way cocks as will be described in the following specification and set out in the claims appended thereto.

One embodiment of my invention, together with some modifications thereof, are shown in the accompanying drawings, wherein—

Figure 4:
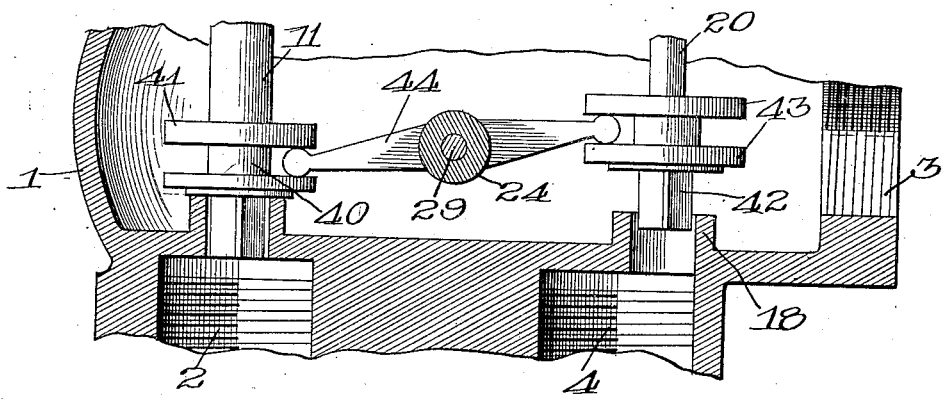

Figure 1 is a vertical section through a three-way cock of the character described. Fig. 2 is a horizontal section through the same. Fig. 3 is a section similar to Fig. 1, illustrating a modification; and Fig. 4 is a similar section illustrating another modification.

Like characters of reference indicate like parts in the several figures of the drawings.

Referring first to Figs. 1 and 2, 1 represents the valve casing, which preferably consists of a single casting. This casing is provided with the inlet port 2, the outlet port 3 and the drip port 4. Above the inlet port is an opening 5, which is closed by the nut 6. Above the drip port is an opening 7, closed by the nut 8. The inlet port 2 has surrounding it a valve seat 9 and is adapted to be closed by the valve 10 on the stem 11, which is screw threaded at 12 and passes through the nut 6, a stuffing box being formed by the cap nut 13, which contains the packing 14. The stem is operated by the usual hand wheel 15. The valve itself consists of a cylinder of metal in which is seated the gasket 16, composed of rubber, or some rubber compound, and held in position by the nut 17. Any other form of valve might be substituted for the one described. The drip port 4 has the seat 18 and is closed by valve 19, having the spindle 20, which extends into a boss 21 on the nut 8. On the under side of the valve is a nut 22, which serves as a guide. A coiled spring 23 tends to force the valve to its seat. Pivoted in the valve casing is a lever, either end of which is connected with one of the valves 10, 19. This lever preferably comprises a hub 24, from which extend the forks 25, 26, the fork 25 engaging with a rib 27 on valve 10, the fork 26 engaging a similar rib 28 on valve 19. The lever may be pivoted within the casing in any desired manner. I have shown in Figs. 1 and 2 a simple expedient for accomplishing this, which makes the structure compact, the parts easy to assemble, and, at the same time, prevents leakage. Through the hub 24 extends a pivot pin 29, one end of which is journaled in an aperture 30 in a boss 31 on the inside of the valve casing, the other end extending through the opposite side of the valve casing and being held in position by a nut 32 having a threaded portion 33 screwing into a threaded recess in the outside of the valve casing.

In operation, when this cock is used to control the supply and drip pipes of a car heating system, when steam is to be admitted to the system, hand wheel 15 will be turned so as to raise valve 10 from its seat, admitting steam through the casing into the system of steam pipes connected to the casing at the outlet port 3. By the forked construction of the lever a sufficient leverage can be obtained even though the valves 10 and 19 stand close together. The device when so constructed can be easily assembled. With nuts 6 and 8 removed, the lever can be placed in the casing and pivoted by the pin 29. The valves can then be put in place and the nuts screwed down. If any of the parts should become worn or broken, they may be easily replaced by workmen having little or no mechanical skill. It will be seen that the structure is very compact. This is very desirable when the valve is used in a railway car heating system, because, in the first place, the pipes come close together and, in the second place, because the valve must be arranged so as not to be an obstruction. The casing is preferably composed of a single casting, the smaller this casting can be made the better, for reasons of economy, castings of this sort being ordinarily of brass. According to the above described arrangement, the size of the casing is reduced to a minimum while, at the same time, it is so constructed as to permit the easy assembling of the parts contained therein.

In Fig. 3 I have shown a modified construction in which the spring on the drip pipe valve works from the opposite direction. In this modification the valve 34 is provided with a rib 35 which lies under the lever 36, the valve being forced away from its seat by a spring 37. The valve for the supply pipe, designated 38, has correspondingly a rib 39, which likewise lies under the end of lever 36. This construction has the advantage that the drip pipe valve is forced to its seat by a positive action. It has the disadvantage, however, of greater difficulty in the assembling of the parts and in requiring a larger casing.

In Fig. 4 I have shown still another modification, in which the spring is dispensed with. Here the inlet valve 40 has a pair of ribs or abutments 41, the drip pipe valve 42 having similar ribs or abutments 43, the ends of the lever 44 extending into the spaces between these pairs of ribs. This construction is available only when there is sufficient distance between the two valves to give working leverage.

I wish it to be understood that I do not limit myself to the exact devices, constructions and arrangements herein shown and described, as obvious modifications will occur to those skilled in the art.

I claim:

1. The combination with a casing having an inlet port and a drip port through the under side thereof parallel to each other, valves within said casing for said ports, a lever having forks on each end extending around and engaging the valves and a central hub which bears on each side against the casing, a pivot extending through said hub mounted in an aperture within the casing at one end and at the other end extending through a perforation in the casing, said casing having a recess on the outside thereof around said perforation, a screw plug which screws into said recess and abuts the end of the pivot, a stem on one valve extending through the casing, and a spring against which the other valve is operated.

2. The combination with a casing having an inlet port and a drip port through the under side thereof parallel to each other, valves within said casing for said ports, a lever having means thereon engaging said valves and a certain hub which bears on each side of the casing; a pivot extending through said hub mounted in an aperture within the casing at one end and at the other extending through a perforation in said casing, said casing having a recess in the outside thereof around said perforation, a screw plug which screws into the recess and abuts the end of the pivot, a stem on one valve extending through the casing, and a spring against which the other valve is operated.

3. A combination with a casing having an inlet port and a drip port through the under side thereof parallel to each other, valves within said casing for said ports, a lever having means thereon engaging said valves and a central hub which bears on each side of the casing; a pivot extending through said hub mounted in an aperture within the casing at one end and at the other extending through a perforation in said casing, said
5 casing having a recess in the outside thereof around said perforation, a screw plug to screw into the recess and abut the end of the pivot, and a stem on one of said valves which extends through the casing.

EGBERT H. GOLD.

Witnesses:
G. Y. SKINNER,
P. H. TRUMAN.

It is hereby certified that in Letters Patent No. 909,583, granted January 12, 1909, upon the application of Egbert H. Gold, of Chicago, Illinois, for an improvement in "Three-Way Cocks," errors appear in the printed specification requiring correction, as follows: In line 112, page 2, the word "certain" should read *central*, and in line 123, same page, the article "A" should read *The;* and that the said Letters Patent should be read with these corrections therein that the same may conform to the record of the case in the Patent Office.

Signed and sealed this 9th day of February, A. D., 1909.

[SEAL.]

C. C. BILLINGS,
*Acting Commissioner of Patents.*